United States Patent Office 2,835,650
Patented May 20, 1958

2,835,650
HYDROCARBON RESINS ODOR STABILIZED WITH AN ALKYL-ALKOXY MONOPHENOL

Joseph F. Nelson, Westfield, and John F. McKay, Cranford, N. J., assignors to Esso Research and Engineering Company, a corporation of Delaware No Drawing. Application July 29, 1954
Serial No. 446,668

3 Claims. (Cl. 260—45.95)

This invention relates to the stabilization of petroleum resins against development of odor in storage.

The preparation of resins by Friedel-Crafts polymerization of steam-cracked petroleum fractions is well known. Such resins when freshly prepared are solid, light colored, and essentially odorless. They are commercially useful in the preparation of paints and they find application as blending agents with other resins, natural and synthetic rubber, as well as paper impregnants and many other uses. However when these resins are stored for any length of time in closed containers an undesirable "burnt" peroxidized odor develops particularly when the resins are in flake form.

According to the present invention the development of this "burnt" peroxidized odor is substantially completely overcome by the addition to the resin of a small amount of a 2-tertiary-butyl-4-alkoxy phenol in which the alkoxy group contains from 1 to 20 carbon atoms. A particularly suitable addition agent is 2-tertiary-butyl-4-methoxyphenol. This compound can be prepared, for instance, by alkylating 4-methoxy-phenol with one mole of isobutylene.

Hydrocarbon resins to which the present invention is applicable are made by treating a hydrocarbon mixture containing 10 to 35% diolefins and 30 to 65% olefins and 0 to 60% of aromatics, paraffins, and naphthenes with 0.25–2.5% of a Friedel-Crafts type catalyst such as aluminum chloride, aluminum bromide, boron trifluoride, and the like or solutions, slurries, or complexes thereof. The reactions are conducted at temperatures in the range of −100 to +100° C. (preferably −35 to +75° C.). Residual catalyst is quenched by suitable methods, such as addition of methyl alcohol and subsequent filtration, water and/or caustic washing and the final solution is then stripped of unreacted hydrocarbons and low molecular weight oils by vacuum and/or steam distillation. The product is a substantially non-aromatic unsaturated hydrocarbon resin. A hydrocarbon mixture suitable for resin production is conveniently found in hydrocarbon streams obtained by steam cracking gas oils. These streams have boiling ranges between 20° and 280° C., or may be composed of any intermediate fractions thereof. A typical stream shows 20% diolefins, 51% olefins, 27% aromatics, and 2% paraffins and naphthenes. The preparation of these hydrocarbon resins is further described in co-pending patent application Serial No. 295,836, filed June 26, 1952, now U. S. Patent No. 2,698,841.

According to the preferred method of carrying out the invention, to the molten hydrocarbon resin, prepared as described above, there is added 0.05 to 1.0% by weight of 2-t-butyl-4-methoxy phenol while agitating the mixture. The resin is then cooled and if desired may be flaked before storage.

The following example illustrates the benefits to be secured in accordance with the present invention:

Example 1

A sample of petroleum resin, prepared as described above, and having very little odor was melted and to aliquot portions thereof were added 0.2 wt. percent of various inhibitors.

The inhibitors were thoroughly dispersed in the melted resin by stirring. Each sample of resin and inhibitor was cooled and crushed by shattering with a hammer. The samples, along with a crushed control resin, containing no inhibitor, were stored in open containers on a window sill in direct sunlight. To accelerate decomposition, iron filings were admixed with the samples. After three and seven months storage, the containers were capped to accumulate odor and the odor rated three days later. The following results were obtained:

| Sample | Odor Ratings after Storage for— | |
|---|---|---|
| | 3 months | 7 months |
| Control Resin (no inhibitor) | Poor—slight burnt odor. | Poor—badly burnt "peroxide" odor. |
| Resin+0.2 wt. percent 2-t-butyl-4-methoxy phenol. | Excellent—no detectable odor. | Excellent—odor just on edge of perception. |
| Resin+0.2 wt. percent 1,4-diamino-di-hydro-anthraquinone. | Fair—slight odor but superior to control. | Good—slight odor but superior to control. |
| Resin+0.2 wt. percent 2-(2,6-di-tert.-butyl-4-methyl-phenoxy) ethanol. | ⎯⎯do⎯⎯ | Do. |
| Resin+0.2 wt. percent 2,4,6-tri-tert.-butyl phenol. | | Do. |
| Resin+0.2 wt. percent commercial inhibitor. | Fair—slight odor but superior to control. | Do. |
| Resin+0.2 wt. percent thiodiphenylamine. | ⎯⎯do⎯⎯ | Do. |
| Resin+0.2 wt. percent bis (2 hydroxy-2-t-butyl-5-methylphenyl) methane. | ⎯⎯do⎯⎯ | Do. |
| Resin+0.2 wt. percent di-t-butyl paracresol. | | Poor—equivalent to control. |
| Resin+0.2 wt. percent diphenylol propane. | | Poor—worse than control. |
| Resin+0.2 wt. percent 3-pentadecyl-4-amino-phenol. | Poor—worse than control. | Do. |

In addition to the above compounds, fifteen other well known commercially recommended stabilizers were tested and found to have no beneficial effect in prevention of odor formation. The above data clearly show the superiority of 2-tertiary-butyl-4-methoxy phenol as an odor inhibitor for petroleum resins.

The nature of the present invention having been thus fully set forth and specific examples of the same given, what is claimed as new and useful and desired to be secured by Letters Patent is:

1. An odor stable composition comprising an unsaturated hydrocarbon resin prepared by the polymerization of a steam-cracked petroleum fraction boiling in the range between 20° and 280° C. in the presence of a Friedel-Crafts catalyst, and an odor stabilizing amount of 0.05 to 1.0 weight percent of 2-tertiary-butyl-4-methoxy monophenol, based on the resin.

2. A composition according to claim 1 wherein the Friedel-Crafts catalyst is aluminum chloride.

3. A process for odor stabilizing an unsaturated hydrocarbon resin prepared by the polymerization of a steam-cracked petroleum fraction boiling in the range between 20° and 280° C. in the presence of a Friedel-Crafts catalyst which comprises melting said resin, dispersing therein an odor stabilizing amount of 0.05 to 1.0 weight percent of 2-tertiary-butyl-4-methoxy monophenol, and cooling the resulting mixture to the stabilized solid resin.

References Cited in the file of this patent
UNITED STATES PATENTS

| | | |
|---|---|---|
| 2,356,929 | Hart | Aug. 29, 1944 |
| 2,591,651 | Young | Apr. 1, 1952 |
| 2,704,724 | Chenicek | Mar. 22, 1955 |
| 2,730,436 | Young et al. | Jan. 10, 1956 |